(12) United States Patent
Tassé

(10) Patent No.: US 6,812,416 B2
(45) Date of Patent: Nov. 2, 2004

(54) CIRCUIT BREAKER MODULE SAFETY DEVICE AND METHOD

(75) Inventor: Daniel Tassé, Outremont (CA)

(73) Assignee: Hyperchip Inc., Montreal (CA)

( * ) Notice: Subject to any disclaimer, the term of this patent is extended or adjusted under 35 U.S.C. 154(b) by 0 days.

(21) Appl. No.: 10/447,329

(22) Filed: May 29, 2003

(65) Prior Publication Data

US 2004/0031669 A1 Feb. 19, 2004

Related U.S. Application Data

(60) Provisional application No. 60/383,600, filed on May 29, 2002.

(51) Int. Cl.[7] .................................................. H01H 9/20
(52) U.S. Cl. .................................. 200/50.01; 200/50.32
(58) Field of Search ........................... 200/43.14, 43.16, 200/50.32, 50.06, 50.03, 50.1, 50.19, 50.02, 43.19, 50.11, 333, 334; 361/605, 615, 616, 631, 632, 679

(56) References Cited

U.S. PATENT DOCUMENTS

| | | | | |
|---|---|---|---|---|
| 4,644,114 A | * | 2/1987 | Strobel ....................... 200/50.4 |
| 5,148,910 A | * | 9/1992 | Williams .................. 200/43.19 |
| 5,648,646 A | * | 7/1997 | Flegel ...................... 200/50.32 |
| 5,892,192 A | * | 4/1999 | Ishiguro et al. ............. 200/5 R |
| 6,541,719 B1 | * | 4/2003 | Powell ..................... 200/50.32 |
| 6,552,286 B2 | * | 4/2003 | Yang et al. ................. 200/330 |

* cited by examiner

Primary Examiner—Elvin Enad
Assistant Examiner—Lisa Klaus
(74) Attorney, Agent, or Firm—Ogilvy Renault

(57) ABSTRACT

A device and method for deactivating a circuit breaker having an actuating lever and forming part of an electronic module. The electronic module is electrically connected to a power source and is inserted within a housing structure. The deactivating device comprises an activation member moveable between at least two positions, namely activated and deactivated positions, and an interface means for providing a mechanical contact between the activation member and the housing structure. Upon initiating removal of the electronic module from the housing structure for electrical disconnection from the power source, the interface means contacts the activation member to displace the activation member from the activated position to the deactivated position. The activation member in turn contacts the actuating lever to deactivate the circuit breaker thereby ensuring electrical deactivation of the electronic module prior to its electrical disconnection from the power source.

14 Claims, 5 Drawing Sheets

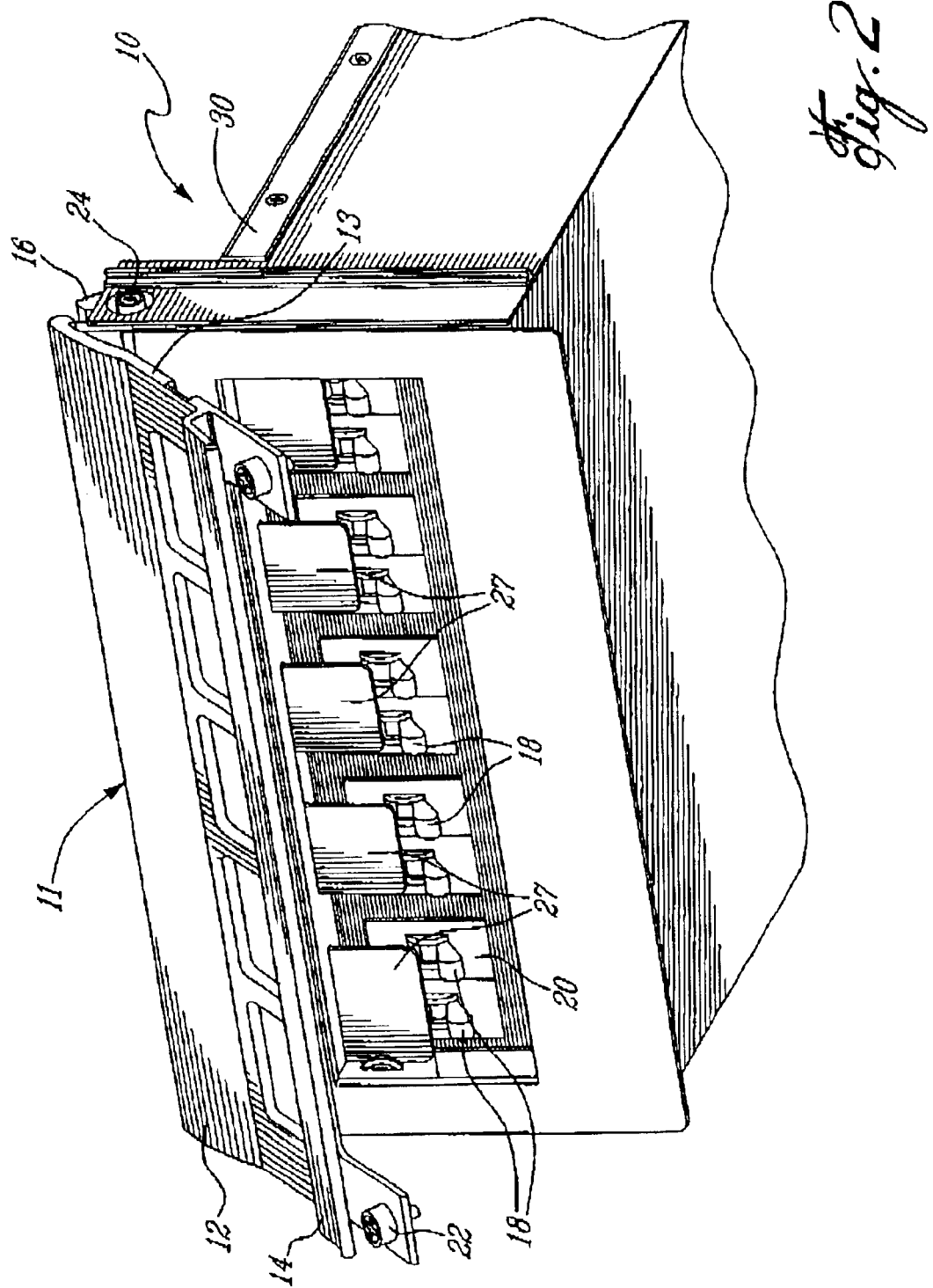

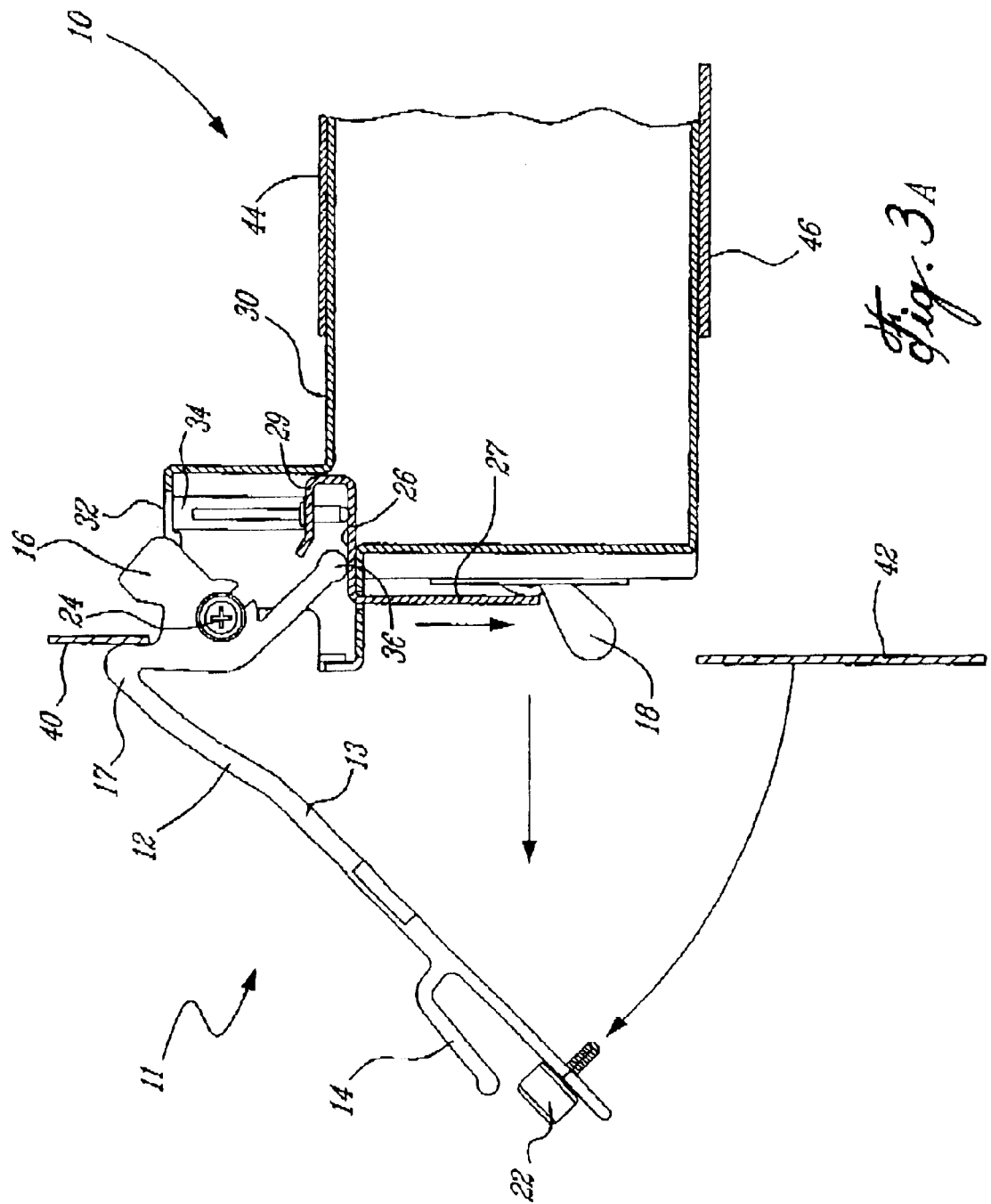

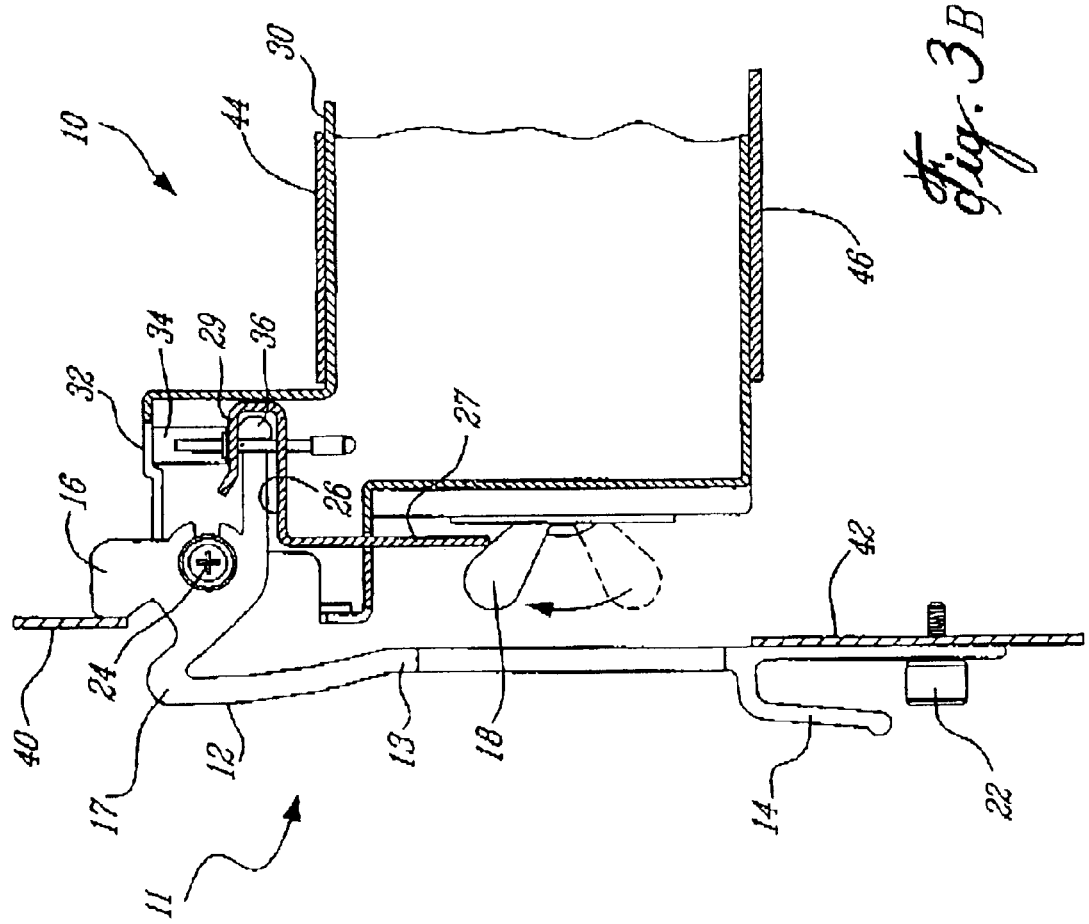

CIRCUIT BREAKER MODULE SAFETY DEVICE AND METHOD

CROSS-REFERENCE TO RELATED APPLICATIONS

This application claims the benefit of priority under 35 U.S.C § 119 from U.S. Provisional Patent Application No. 60/383,600 filed on May 29, 2002, the disclosure of which is incorporated by reference as if set forth in full in this document.

FIELD OF THE INVENTION

This invention relates to the field of supply of electrical power. More particularly, it relates to safe operation of circuit breaker power modules.

BACKGROUND OF THE INVENTION

A problem present when supplying power to electronic equipment is that when removing, for example, an electrical power module from an electronic equipment rack, electrical spikes or sparks may occur if all circuit breakers are not safely deactivated prior to electrical disconnection of the power module from the electronic equipment rack. These spikes or sparks may damage sensitive electrical circuits and components installed in the electronic equipment rack.

There is a need in the industry for an improved method and device that will enable the safe removal and installation of electronic equipment in, for example, an electronic equipment rack.

SUMMARY OF THE INVENTION

In a preferred embodiment, the present invention relates to a device for deactivating a circuit breaker having an actuating lever and forming part of an electronic module. The electronic module is electrically connected to a power source and is inserted within a housing structure. The deactivating device comprises an activation member moveable between at least two positions, namely activated and deactivated positions, and an interface means for providing a mechanical contact between the activation member and the housing structure. Upon initiating removal of the electronic module from the housing structure for electrical disconnection from the power source, the interface means contacts the activation member to displace the activation member from the activated position to the deactivated position. The activation member in turn contacts the actuating lever to deactivate the circuit breaker thereby ensuring electrical deactivation of the electronic module prior to its electrical disconnection from the power source.

In another preferred embodiment, the present invention relates to a method for deactivating the foregoing circuit breaker. The method comprises releasing the electronic module to remove it from within the housing structure. Upon release of the electronic module, the method includes causing the actuating lever to deactivate the circuit breaker thereby ensuring electrical deactivation of the electronic module prior to electrically disconnecting the electronic module from the power source.

BRIEF DESCRIPTION OF THE DRAWINGS

In the appended drawings:

FIG. 2 is a front perspective view of the device of FIG. 1 shown in the deactivated position;

FIG. 3a is a side view of the device of FIG. 1 shown in the deactivated position;

FIG. 3b is a side view of the device of FIG. 1 shown in the activated position.

DESCRIPTION OF THE PREFERRED EMBODIMENT

Figure 1:
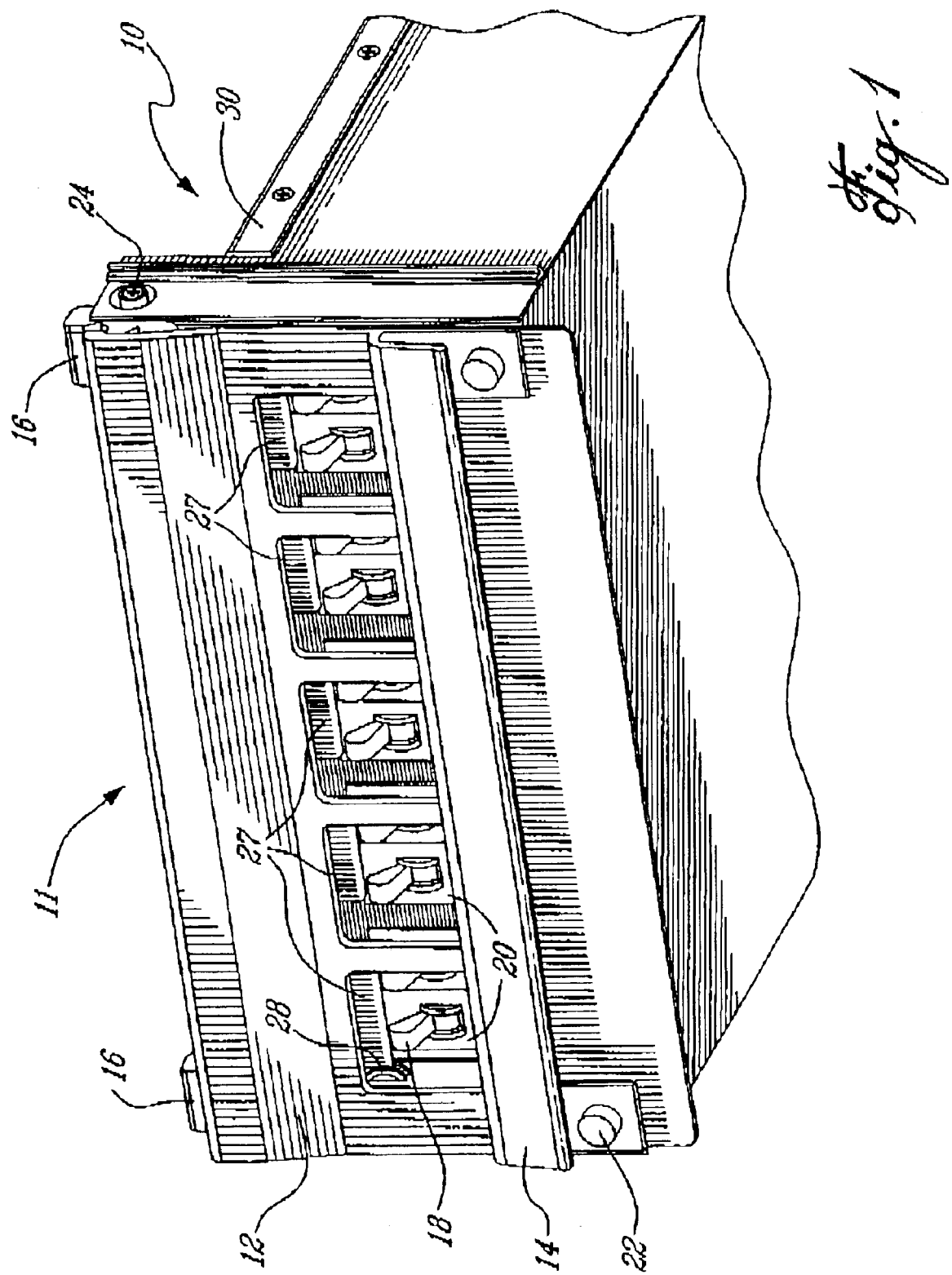
FIG. 1 is a front perspective view of a circuit breaker module safety device in accordance with an embodiment of the invention.

As shown in FIGS. 1, 2, 3a and 3b, the circuit breaker module safety device 11 is installed on an electronic module 10. In an exemplary embodiment, electronic module 10 comprises an electrical power module. The electronic module 10 comprises, in a preferred embodiment, a series of circuit breakers 20. Each circuit breaker 20 has an actuating lever 18 for closing (operating mode, activated position, FIG. 1) or opening (non-operating mode, deactivated position, FIG. 2) an electrical circuit. The electronic module 10 is normally installed in a housing structure 40, 42, 44, 46. In a preferred embodiment, the housing structure comprises a housing structure where many other components such as electronic circuit boards may be installed.

In a preferred embodiment, the circuit breaker module safety device 11 comprises an interface means 12 and an activation member 26. The activation member contacts the circuit breaker actuating lever 1B.

In a preferred embodiment, the activation member 26 comprises a guillotine-like portion 27 which slide within guide members 28 located on each side of the electronic module frame. In this preferred embodiment, the guillotine-like portion 27 contacts the actuating lever 18. The activation member moves between two positions: the activated (shown in FIGS. 1 and 3b) and deactivated positions (shown in FIGS. 2 and 3a).

In a preferred embodiment, the interface means 12 serves at least two functions. The first is to securely lock in place the electronic module 10 within a housing structure to thereby ensure electrical contact is maintained between the electronic module 10 and a power source (not shown). In a preferred embodiment, connection of the electronic module 10 to the power source takes place at the back of the electronic module 10. The second function of the interface means 12 in this embodiment is to displace the activation member 26 between its activated and deactivated positions thereby permitting operation or non-operation of electrical circuits protected by the circuit breakers 20.

In a preferred embodiment, the interface means 12 comprises a locking mechanism having a locking arm 13 that rotates about a pivot axis 24 between a closed (shown in FIGS. 1 and 3b) and open position (not shown) through an intermediate position (shown in FIGS. 2 and 3a), The closed and intermediate positions respectively correspond to the activated and deactivated positions of the activation member 26. The interface means 12 may also include a locking lever 16. The locking lever 16 also rotates about pivot axis 24. The movement of the locking arm 13 toward the closed position moves the locking lever 16 substantially toward the front. During this substantially downward and rearward movement of the locking arm 13, the locking lever 16 abuts against a portion 40 of the housing structure. The frontward movement of the locking lever 16 exerts pressure on the electronic module 10 to move rearward and thereby facilitate and ensure electrical connection to the housing structure.

Movement of the locking arm 13 toward the open position moves another portion 17 of the locking lever 16 substantially toward the rear. During this substantially upward and frontward movement of the locking arm 13, portion 17 abuts against a portion 40 of the housing structure, The rearward movement of portion 17 exerts pressure on the electronic module 10 to move forward and thereby facilitates disconnection of electronic module 10 from the power source (not shown) and removal of electronic module 10 from the housing structure.

The interface means 12 may also include a linkage arm 36, The linkage arm 36 provides a mechanical link between the interface means 12 and the activation member 26. In an embodiment of the invention, the linkage arm 36 also rotates about the pivot axis 24. An end of linkage arm 36 moves within a c-shaped portion 29 of the activation member 26, The movement of the interface means 12 toward the closed position moves the linkage arm 36 in a generally upward direction. The general upward movement of the linkage arm 36 results in the upward movement of the activation member 26 thereby permitting movement of the circuit breaker 20 actuating levers 18 to the operating position. The levers 18 would normally be displaced to the operating position by hand.

The interface means 12 may also include a handle 14 to help the user in moving the interface means 12 between its open and closed positions.

The interface means 12 may also include releasable fasteners 22. The releasable fasteners 22 are used for releasably locking the interface means 12 in the closed position, In an embodiment of the invention, releasable fasteners may include screws. A person skilled in the art could imagine other ways of releasably locking the interface means 12 in the closed position.

In a preferred embodiment, the locking mechanism has a locked state and unlocked state, whereby, upon changing state from locked to unlocked, the locking mechanism displaces the activation member 26 from the activated position to the deactivated position.

In an embodiment of the invention, the circuit breaker module safety device 11 further includes biasing means 34. The biasing means 34 exerts pressure between the non-moving end portion 32 of the electronic module cover 30 and the activation member 26. This results in urging the activation member 26 toward the deactivated position and the interface means toward the open position. The releasable fasteners 22 are very useful when the deactivating device 11 includes biasing means 34. That is, when the releasable fasteners 22 are not fastened, the interface means 12 cannot be maintained in the closed position by itself.

In an embodiment of the invention the interface means 12 also serves as a cover for protecting the actuating levers 18 from being inadvertently moved to the non-operating position.

In another exemplary embodiment, the invention provides a method for deactivating a circuit breaker 20 prior to electrically disconnecting an electronic module 10 from a housing structure 40, 42, 44, 46. The method comprises releasing (unlocking) the electronic module 10 to permit removal of the electronic module 10 from within the housing structure. In a preferred embodiment, the interface means 12, being in mechanical contact with activation member 26, which is moveable between activated and deactivated positions, moves the activation member from the activated position to the deactivated position. The activation member 26 in turn contacts the circuit breaker's actuating lever 18 to open the electronic module's electrical circuit (not shown), which is protected by the circuit breaker 20, thereby ensuring electrical deactivation of the electronic module prior to electrically disconnecting the electronic module 10 from a power source (not shown). The electronic module 10 can then be removed from the housing structure for maintenance, replacement, or other reasons.

Figure 4:
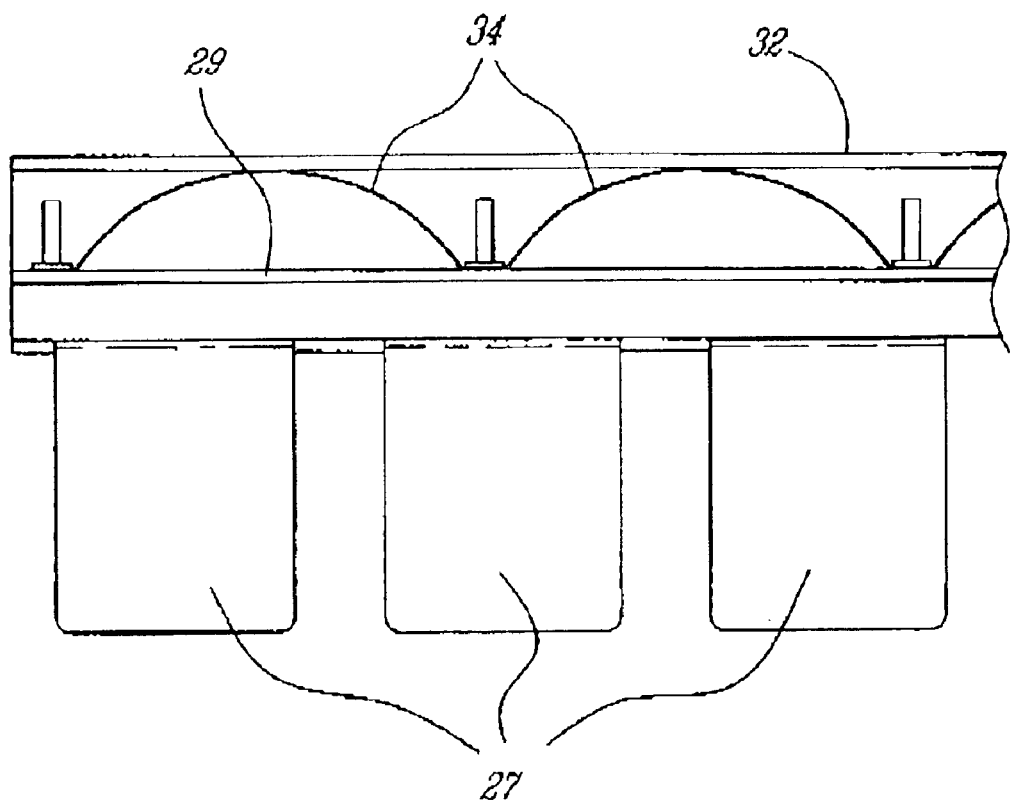
FIG. 4 is a front view of a part of the device of FIG. 1.

Now referring to FIG. 4, a front view of the circuit breaker module safety device 11. Biasing means 34 exerts pressure between the non-moving end portion 32 of the electronic module cover 30 and the activation member 26. Guillotine-like portion 27 of activation member 26 is also shown in FIG. 4.

Although the present invention has been described hereinabove by way of preferred embodiments thereof, it can be modified, without departing from the spirit and nature of the subject invention as defined in the appended claims.

What is claimed is:

1. A device for deactivating a circuit breaker having an actuating lever and forming part of an electronic module electrically connected to a power source and inserted within a housing structure, said device comprising:
   a. an activation member moveable between at least two positions, namely activated and deactivated positions; and
   b. an interface means for providing a mechanical contact between said activation member and said housing structure,
      wherein upon initiating removal of said electronic module from said housing structure for electrical disconnection from said power source, said interface means contacts said activation member to displace said activation member from said activated position to said deactivated position, said activation member in turn contacts said actuating lever to deactivate said circuit breaker thereby ensuring electrical deactivation of said electronic module prior to its electrical disconnection from said power source.

2. The device for claim 1, wherein said interface means comprises a locking mechanism for releasably locking said electronic module within said housing structure, said locking mechanism having a locked state and unlocked state, whereby, upon changing said state from locked to unlocked, said locking mechanism displaces said activation member from said activated position to said deactivated position.

3. The device of claim 2, wherein said locking mechanism comprises a locking lever rotating about a pivot axis and abutting against said housing structure, whereby upon rotation of locking lever about said pivot axis said locking lever exerts pressure on said electronic module to alternatively electrically connect said electronic module to, and disconnect said electronic module from, said power source.

4. The device of claim 3, further comprising a biasing means for urging said activation member toward said deactivated position.

5. The device of claim 4, wherein said activation member comprises a guillotine-like portion contacting said actuating lever to deactivate said circuit breaker.

6. The device of claim 5, wherein said locking mechanism comprises a releasable fastener for releasably locking said locking mechanism in said closed position.

7. The device of claim 6, further comprising biasing means for urging said activation member toward said deactivated position.

8. The device of claim 7, wherein locking mechanism comprises a linkage arm rotating about said pivot axis and for providing said mechanical contact between said activation member and said locking mechanism.

9. The device of claim 8, wherein said locking mechanism comprises a handle.

10. The device of claim 9, wherein said electronic module comprises more than one circuit breaker and said activation member contacts more than one actuating lever.

11. The device of claim 1, wherein said activation member comprises a guillotine-like portion, said guillotine portion contacting said actuating lever to deactivate said circuit breaker.

12. A method for deactivating a circuit breaker having an actuating lever and forming part of an electronic module electrically connected to a power source and inserted within a housing structure, said method comprising:

a. releasing said electronic module to remove it from within said housing structure; and b. upon release of said electronic module, causing said actuating lever to deactivate said circuit breaker thereby ensuring electrical deactivation of said electronic module prior to electrically disconnecting said electronic module from said power source.

13. The method of claim 12, wherein said releasing comprises unlocking said electronic module from within said housing structure.

14. The method of claim 13, further comprising pivoting a lever means pivotally connected to said electronic module to electrically disconnect said electronic module from said power source.

\* \* \* \* \*